US00RE45490E

(19) United States
(12) Reissued Patent
Italia et al.

(10) Patent Number: US RE45,490 E
(45) Date of Reissued Patent: Apr. 28, 2015

(54) PAINTBALL GUN LOADING METHODS AND APPARATUS

(71) Applicant: G.I. Sportz Inc., Lachine (CA)

(72) Inventors: Richmond Italia, Ile Bizard (CA); Michael Steven Spurlock, Semmes, AL (US); Chun Min Wu, Tainan (TW); Chien Ming Chen, Kahosiung Hsien (TW)

(73) Assignee: G.I. Sportz, Inc., Quebec (CA)

(21) Appl. No.: 13/685,994

(22) Filed: Nov. 27, 2012

Related U.S. Patent Documents

Reissue of:
(64) Patent No.: 7,841,328
Issued: Nov. 30, 2010
Appl. No.: 11/879,961
Filed: Jul. 19, 2007

U.S. Applications:
(60) Provisional application No. 60/831,662, filed on Jul. 19, 2006, provisional application No. 60/849,024, filed on Oct. 4, 2006.

(51) Int. Cl.
*F41B 11/00* (2013.01)
*F41B 11/57* (2013.01)
(Continued)

(52) U.S. Cl.
CPC ..... *F41B 11/57* (2013.01); *F41B 11/53* (2013.01); *F41B 11/52* (2013.01)

(58) Field of Classification Search
USPC ..... 124/48, 49, 51.1; 220/211, 230, 260
See application file for complete search history.

(56) References Cited

U.S. PATENT DOCUMENTS

| | | | | |
|---|---|---|---|---|
| 5,097,816 | A | 3/1992 | Miller | 124/49 |
| 5,282,454 | A | 2/1994 | Bell et al. | 124/49 |
| 5,329,212 | A * | 7/1994 | Feigleson | 318/16 |

(Continued)

FOREIGN PATENT DOCUMENTS

| | | |
|---|---|---|
| WO | WO 02/48634 A1 | 6/2002 |
| WO | WO 2007/033309 A3 | 3/2007 |

(Continued)

OTHER PUBLICATIONS

International Search Report for PCT International Application No. PCT/US2007/016364 mailed Nov. 30, 2007.

*Primary Examiner* — John Ricci
(74) *Attorney, Agent, or Firm* — Craig R. Rogers; Simple IP Law, P.C.

(57) ABSTRACT

Methods, apparatus, systems, and kits for loading paintballs into a feed tube of a paintball gun are disclosed. A loader includes a chamber for holding paintballs, a feed mechanism having a rotational feeder within the chamber that feeds paintballs from the chamber along a feed channel when rotating to fill the feed tube, and a drive mechanism that drives the rotational feeder of the feed mechanism, ceases to drive the rotational feeder responsive to stoppage of the rotational feeder, and periodically attempts to rotate the stopped rotational feeder. Paintballs are loaded from a loader into a feed tube of a paintball gun by driving a rotational feeder within the loader, the rotational feeder configured within the loader to feed paintballs into the feed tube when rotating, ceasing to drive the rotational feeder responsive to stoppage of the rotational feeder, and periodically attempting to rotate the stopped rotational feeder.

15 Claims, 12 Drawing Sheets

(51) Int. Cl.
*F41B 11/53* (2013.01)
*F41B 11/52* (2013.01)

(56) References Cited

U.S. PATENT DOCUMENTS

| | | | | |
|---|---|---|---|---|
| 5,722,383 | A | 3/1998 | Tippmann, Sr. et al. | 124/76 |
| 5,791,325 | A | 8/1998 | Anderson | 124/56 |
| 5,794,606 | A | 8/1998 | Deak | 124/51.1 |
| 5,809,983 | A | 9/1998 | Stoneking | 124/50 |
| 5,816,232 | A | 10/1998 | Bell | 124/51.1 |
| 5,954,042 | A | 9/1999 | Harvey | 124/51.1 |
| 6,015,058 | A | 1/2000 | Parks | 220/229 |
| 6,109,252 | A | 8/2000 | Stevens | 124/51.1 |
| 6,213,110 | B1 | 4/2001 | Christopher et al. | 124/51.1 |
| 6,234,157 | B1 | 5/2001 | Parks | 124/45 |
| 6,305,367 | B1 | 10/2001 | Kotsiopoulos et al. | 124/49 |
| 6,311,682 | B1 | 11/2001 | Rice et al. | 124/71 |
| 6,327,953 | B1 | 12/2001 | Andresen | 89/33.17 |
| 6,347,621 | B1 | 2/2002 | Guthrie | 124/48 |
| 6,415,781 | B1 | 7/2002 | Perrone | 124/51.1 |
| 6,418,919 | B1 | 7/2002 | Perrone | 124/49 |
| 6,467,473 | B1 | 10/2002 | Kostiopoulos | 124/51.1 |
| 6,481,432 | B2 | 11/2002 | Rushton et al. | 124/49 |
| 6,488,019 | B2 | 12/2002 | Kotsiopoulos | 124/51.1 |
| 6,502,567 | B1 | 1/2003 | Christopher et al. | 124/51.1 |
| 6,520,171 | B2 | 2/2003 | Reible | 124/73 |
| 6,591,824 | B2 | 7/2003 | Hatcher | 124/56 |
| 6,601,780 | B1 | 8/2003 | Sheng | 239/337 |
| 6,609,511 | B2 | 8/2003 | Kotsiopoulos et al. | 124/51.1 |
| 6,615,814 | B1 | 9/2003 | Rice et al. | 124/71 |
| 6,644,293 | B2 | 11/2003 | Jong | 124/52 |
| 6,684,873 | B1 | 2/2004 | Anderson et al. | 124/82 |
| 6,701,907 | B2 | 3/2004 | Christopher et al. | 124/48 |
| 6,739,323 | B2 | 5/2004 | Tippmann, Jr. | 124/51.1 |
| 6,792,933 | B2 | 9/2004 | Christopher et al. | 124/56 |
| 6,807,959 | B1 | 10/2004 | Murdock et al. | 124/61 |
| 6,860,258 | B2 | 3/2005 | Farrell | 124/51.1 |
| 6,889,680 | B2 | 5/2005 | Christopher et al. | 124/51.1 |
| 6,915,792 | B1 | 7/2005 | Sheng | 124/48 |
| 6,925,997 | B2 | 8/2005 | Sheng | 124/74 |
| 6,928,999 | B1 | 8/2005 | Hslao et al. | 124/32 |
| 6,978,776 | B2 | 12/2005 | Hamilton | 124/51.1 |
| 7,017,569 | B2 | 3/2006 | Jong | 124/52 |
| 7,021,302 | B2 | 4/2006 | Neumaster et al. | 124/48 |
| D544,047 | S | 6/2007 | Bell et al. | D21/573 |
| 7,229,105 | B2 | 6/2007 | Broersma | 285/399 |
| 7,270,120 | B2 | 9/2007 | Broersma et al. | 124/51.1 |
| 7,458,370 | B2 * | 12/2008 | Chen | 124/51.1 |
| 2002/0020402 | A1 | 2/2002 | Kotsiopoulos | 124/76 |
| 2004/0174268 | A1 * | 9/2004 | Scott et al. | 340/686.6 |
| 2006/0054151 | A1 | 3/2006 | Christopher et al. | 124/48 |
| 2006/0086347 | A1 | 4/2006 | Hedberg | 124/51.1 |
| 2006/0130822 | A1 | 6/2006 | Jong | 124/51.1 |
| 2006/0157041 | A1 | 7/2006 | Friesen | 124/51.1 |
| 2006/0249131 | A1 | 11/2006 | Broersma | 124/41.1 |
| 2007/0012304 | A1 | 1/2007 | van Dorsser et al. | 124/51.1 |
| 2007/0017495 | A1 * | 1/2007 | Andresen | 124/51.1 |
| 2007/0056573 | A1 | 3/2007 | Campo | 124/49 |
| 2007/0101981 | A1 | 5/2007 | Chen | 124/51.1 |

FOREIGN PATENT DOCUMENTS

| | | | |
|---|---|---|---|
| WO | WO 2007/044546 | A2 | 4/2007 |
| WO | WO 2007/044822 | A2 | 4/2007 |

* cited by examiner

PAINTBALL GUN LOADING METHODS AND APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a broadening reissue of U.S. Pat. No. 7,841,328, which issued from U.S. patent application Ser. No. 11/879,691, filed Jul. 19, 2007, entitled "PAINTBALL GUN LOADING METHODS AND APPARATUS," which* claims the benefit of the filing dates of U.S. *Provisional Patent* Application [Ser.] No. 60/831,662, entitled "DRIVE SYSTEM FOR LOADER OF PAINTBALL GUN," filed Jul. 19, 2006, and U.S. *Provisional Patent* Application [Ser.] No. 60/849,024, entitled "DRIVE SYSTEM FOR LOADER OF PAINTBALL GUN," filed Oct. 4, 2006, both of which are incorporated fully herein by reference *in their entireties*.

FIELD OF THE INVENTION

The present invention relates to paintball gun loaders and, more particularly, to methods and apparatus for loading paintballs into paintball guns.

BACKGROUND OF THE INVENTION

The game of paintball uses paintball guns to project balls of paint is ("paintballs") at opponents. A loading device ("loader") loads paintballs into a feed tube leading to the firing breach of the paintball guns. One performance measurement of a paintball gun is the rate at which it projects paintballs, commonly measured in balls per second ("BPS").

Conventional paintball guns and loaders used therewith may encounter time delays between the actuation of the firing sequence of the paintball gun to fire a paintball and the actuation of the loader to deliver more paintballs into the feed tube of the paintball gun. For example, the loader may wait for movement of paintballs within a neck of the loader leading to the feed tube of the paintball gun before actuation. Since high-end paintball guns typically have sensors in the breach of the gun to prevent firing until a paintball is fully inserted into the breach, the actuation of the loader effectively controls the maximum rate of fire. This may be undesirable for competitive players desiring a maximum rate of fire at any given time.

SUMMARY OF THE INVENTION

The present invention is embodied in methods, apparatus, systems, and kits for loading paintballs from a loader into a feed tube of a paintball gun. An exemplary loader includes a chamber for holding paintballs, a feed mechanism having a rotational feeder within the chamber that feeds paintballs from the chamber along a feed channel when rotating to fill the feed tube, and a drive mechanism that drives the rotational feeder of the feed mechanism, ceases to drive the rotational feeder responsive to stoppage of the rotational feeder, and periodically attempts to rotate the stopped rotational feeder.

In an exemplary embodiment, paintballs are loaded from a loader into a feed tube of a paintball gun by driving a rotational feeder within the loader, the rotational feeder configured within the loader to feed paintballs into the feed tube when rotating, ceasing to drive the rotational feeder responsive to stoppage of the rotational feeder, and periodically attempting to rotate the stopped rotational feeder.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1:
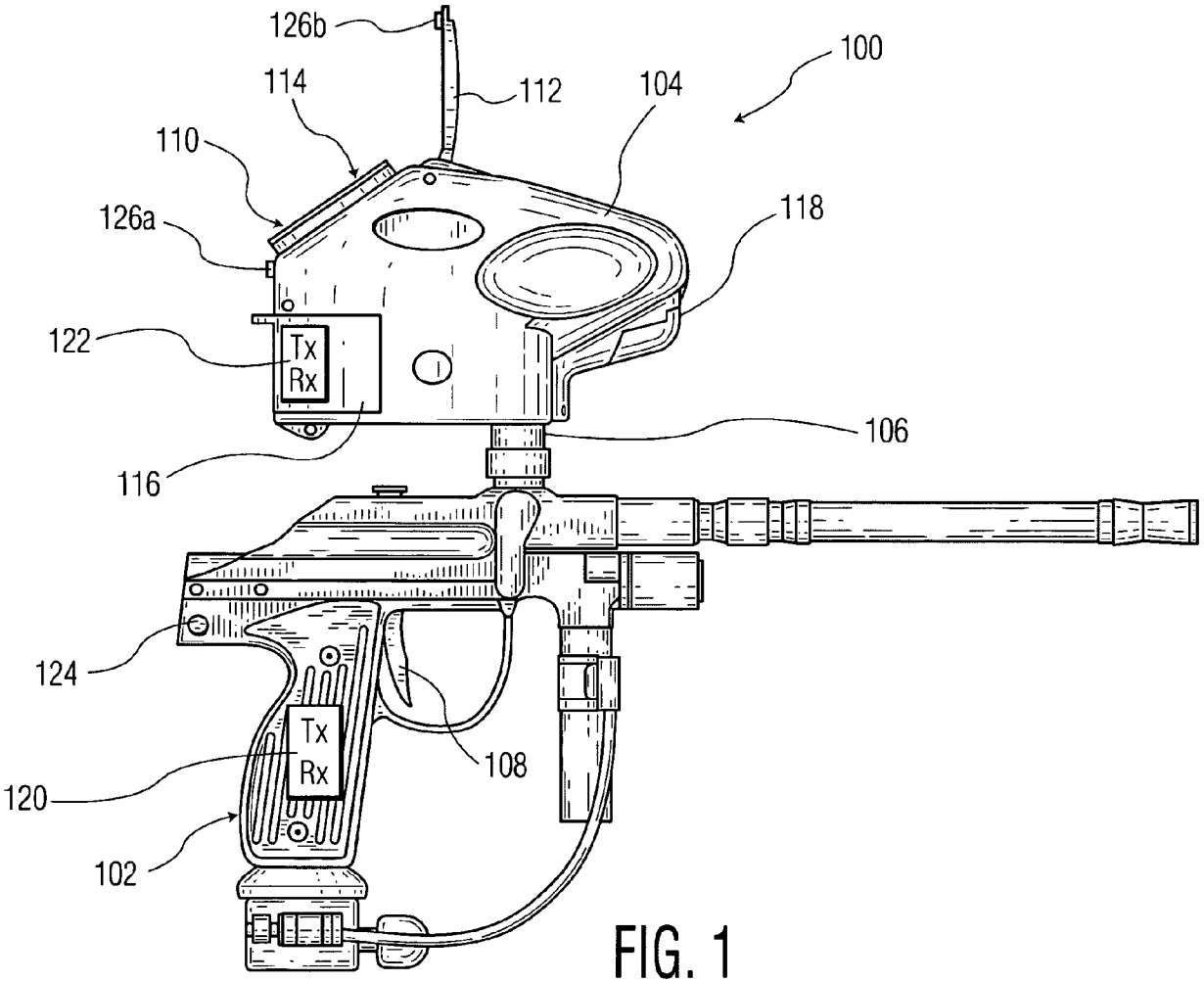
FIG. 1 is a side view of a paintball gun assembly including a paintball gun and a loader with a drive/feed mechanism installed in accordance with an aspect of the present invention.

FIG. 1 depicts an exemplary paintball gun assembly 100. Paintball gun assembly 100 includes a paintball gun 102 and a loader 104 that loads paintballs into a feed tube 106 of paintball gun 102. Paintball gun 102 and loader 104 may be supplied as components of a kit.

Paintball gun 102 includes a firing breach (not shown) connected to the feed tube 106 and a trigger 108. A compressed gas source such as a cylinder tank (not shown) is typically secured to the paintball gun 102 to supply gas to the firing breach in order to launch/project a paintball located within the firing breach from the paintball gun 102. The compressed gas source may contain carbon dioxide or nitric oxide; however, other compressible gasses may be used.

Actuation of trigger 108 results in paintball gun 102 projecting a paintball located in the firing breach, e.g., by introducing gas to the firing breach behind a paintball located therein. Additionally, actuation of trigger 108 may generate a firing signal, e.g., transmitted via an antenna (not shown) and a transceiver 120 such as a radio frequency (RF) transceiver located in the paintball gun 102 for reception at loader 104. The firing signal may be generated using a sensor located in the vicinity of trigger 108. Suitable sensors for use in generating the firing signal in response to the actuation of trigger 108 include magnetic sensors, mechanical sensors, electromechanical sensors, piezoelectric sensors, pressure sensors, accelerometers, etc. In an exemplary embodiment, the firing signal is an encoded signal including a unique identification number, for example.

In alternative embodiments, a firing signal may be generated by paintball gun 102 in response to detection of a paintball being fired, movement of a paintball within paintball gun 102, paintball gun 102 completing a firing cycle, and/or movement of components within paintball gun 102. Electromechanical sensors, infrared (IR) sensors, contact pads, optical sensors, sound sensors, shock sensors, piezoelectric sensors, or other such sensors may be used to detect paintball position and/or movement within paintball gun 102, for example. Additionally, "anti-chop" sensors (such as optical sensors) within the firing breach of paintball gun 102 may be used to detect paintball position and/or movement within paintball gun 102. Suitable detection methods will be understood by one of skill in the art from the description herein.

In other embodiments, a radar sensor (not shown) mounted on the loader 104 or in communication with loader 104 may be used to detect paintballs leaving paintball gun 102 in order to generate a firing signal and/or determine rate of fire, for example. The radar sensor may also be used to detect if paintballs are being fired at the operator of paintball gun 102. Detection of paintballs being fired at the operator may be communicated to the operator via audio and/or visual signals presented by the loader 104, e.g., via a speaker and/or display (not shown). Suitable radar sensors, audio devices, and visual devices will be understood by one of skill in the art from the description herein.

Loader 104 includes an opening 110, a lid 112 for covering opening 110, and a chamber 114 for holding paintballs. In FIG. 1, lid 112 is depicted in an open position, thereby allowing the addition of paintballs to chamber 114. A drive/feed mechanism 116 within loader 104 actuates a feeder mechanism including a rotational feeder (described below) to deliver paintballs from chamber 114 to feed tube 106 through a feed neck of loader 104 (described below). A power supply 118 supplies power to drive/feed mechanism 116. In an exemplary embodiment, drive/feed mechanism 116 drives the rotational feeder, ceases to drive the rotational feeder responsive to stoppage of the rotational feeder, and periodically attempts to rotate the stopped rotational feeder.

Drive/feed mechanism 116 may include electronics (described below) including a circuit for receiving a firing signal from the paintball gun 102, e.g., via an antenna (not shown) and a transceiver 122 such as an RF transceiver in the loader 104. In an exemplary embodiment, the firing signal of an operator's paintball gun is encoded with a unique identifier and the electronics are configured by the operator to recognize the unique identifier in order to prevent the drive/feed mechanism 116 from being activated by a firing signal transmitted by another paintball gun. The electronics may be configured by, first, pressing and holding a button associated with the electronics. Optionally, an indicator associated with the electronics may blink at a relatively slow rate to indicate the electronics are ready to receive configuration information. The trigger 108 of paintball gun 102 may then be actuated to transmit configuration information, which is received by the electronics. Optionally, an indicator associated with the electronics may blink at a relatively fast rate to indicate the electronics have been configured responsive to the configuration information.

In an exemplary embodiment, the lid 112 has a magnetic or electro-magnetic loader lid release. Transceiver 120 may be linked to a switching device 124 mounted onto the paintball gun 102. Upon triggering switching device 124, transceiver 120 transmits a lid signal that is received by transceiver 122. The received lid signal prompts loader 104 to reverse the polarity of a magnet 126a on the loader 104, thereby repelling a corresponding magnet 126b on lid 112 to force lid 112 open. This allows the operator of paintball gun 104 to push switching device 124 with the hand holding paintball gun 102 to open lid 112 and use the other hand to quickly and conveniently pour paintballs from a paintball pod into loader 104 without having to first manually open the lid using both hands. In an exemplary embodiment, the lid signal is an encoded signal that allows the same transceivers 120/122 to handle multiple signals, e.g., the lid signal and the firing signal described above. Although transceivers are illustrated (which include both a transmitter and a receiver), it will be understood by one of skill in the art from the description herein that a transmitter without a receiver may be employed if signals are only to be transmitted and a receiver without a transmitter may be employed if signals are only to be received.

In an exemplary embodiment, drive/feed mechanism 116 is part of a component that is separable from chamber 114, which is part of another component. This allows drive/feed mechanism 116 to be manually removed from chamber 114 without tools (i.e., the components are releasably secured), which is known in the art as "field strippable." In alternative embodiments, the drive/feed mechanism 116 and chamber 114 may be at least substantially permanently connected. Additional details regarding loader 104 are described below.

Figure 2:
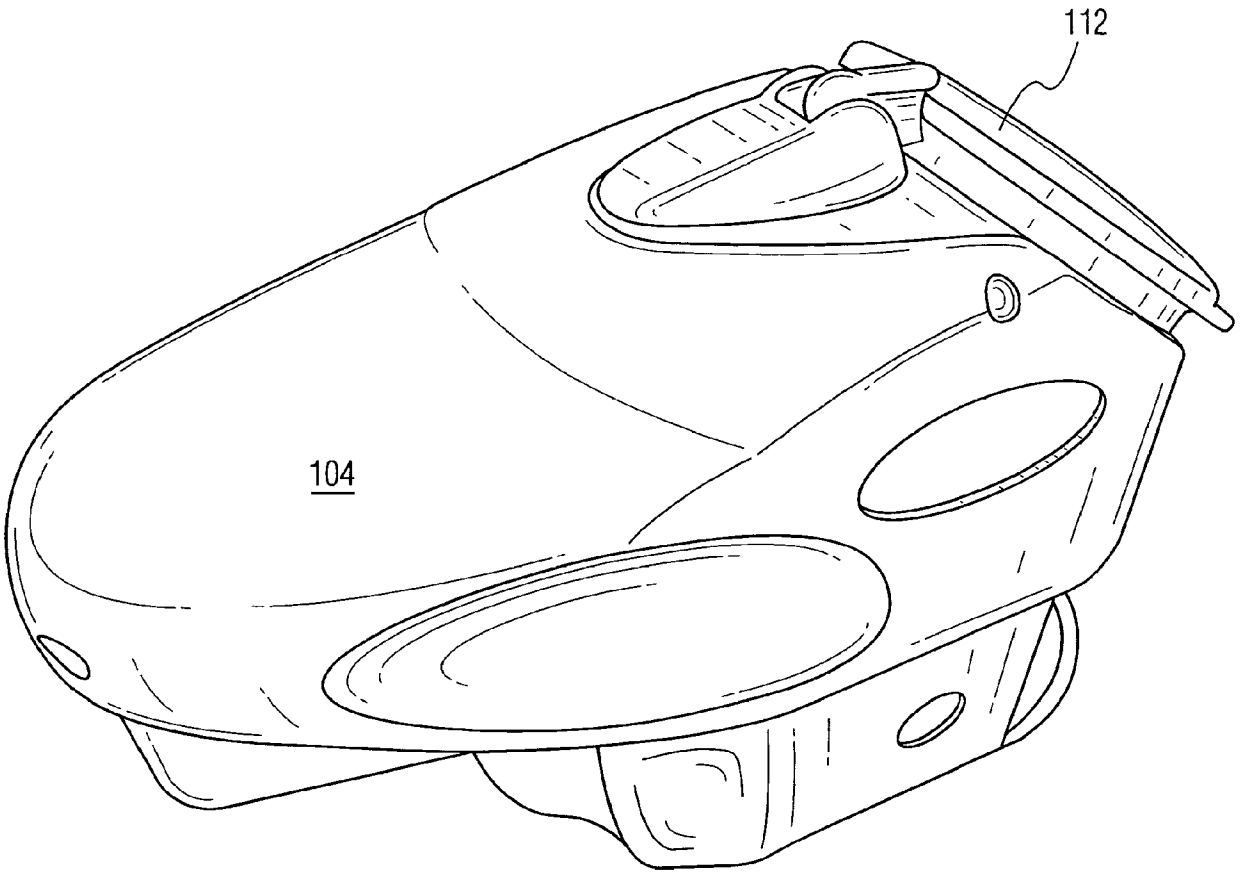
FIG. 2 is a side perspective view of an exemplary loader with the drive/feed mechanism removed in accordance with an aspect of the present invention.
Figure 3:
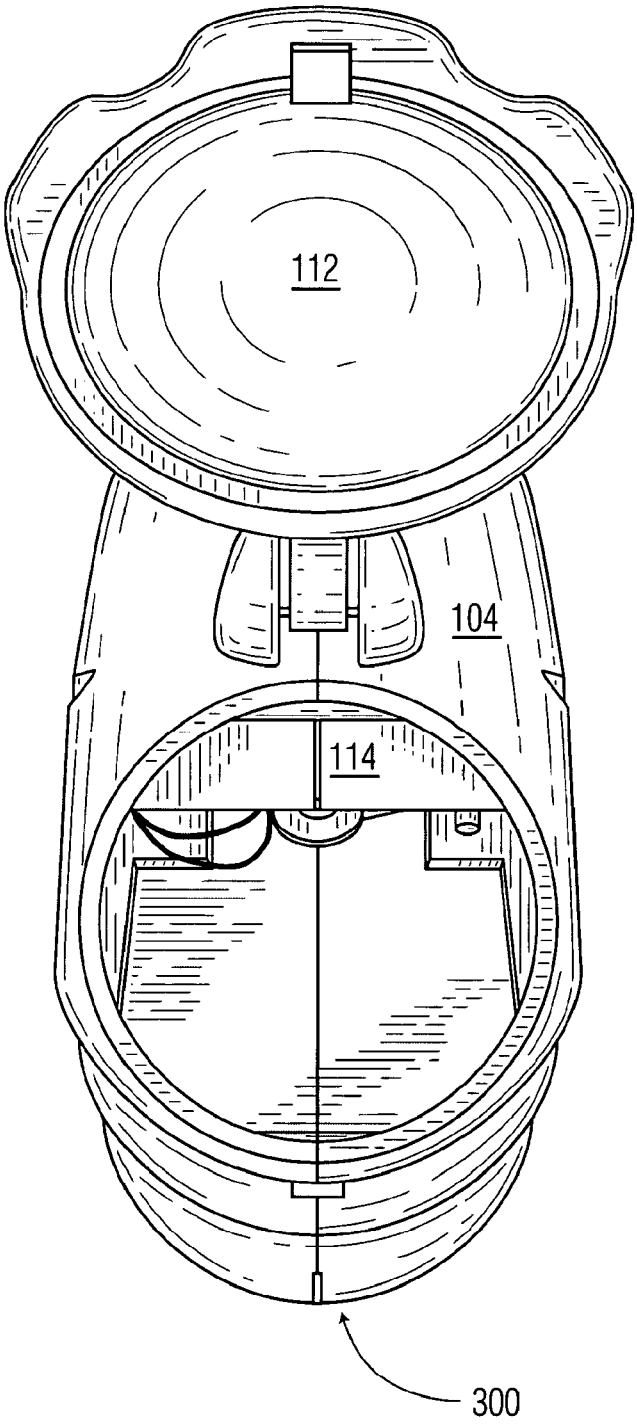
FIG. 3 is a top perspective view of an exemplary loader with the drive/feed mechanism removed in accordance with an aspect of the present invention.

FIG. 2 depicts a side perspective view of loader 104 with lid 112 in a closed position, thereby preventing paintballs within chamber 114 (FIG. 1) from falling out. FIG. 3 depicts a top perspective view of loader 104 with lid 112 in the open position and drive/feed mechanism 116 (FIG. 1) removed, leaving cavity 300.

Figure 4:
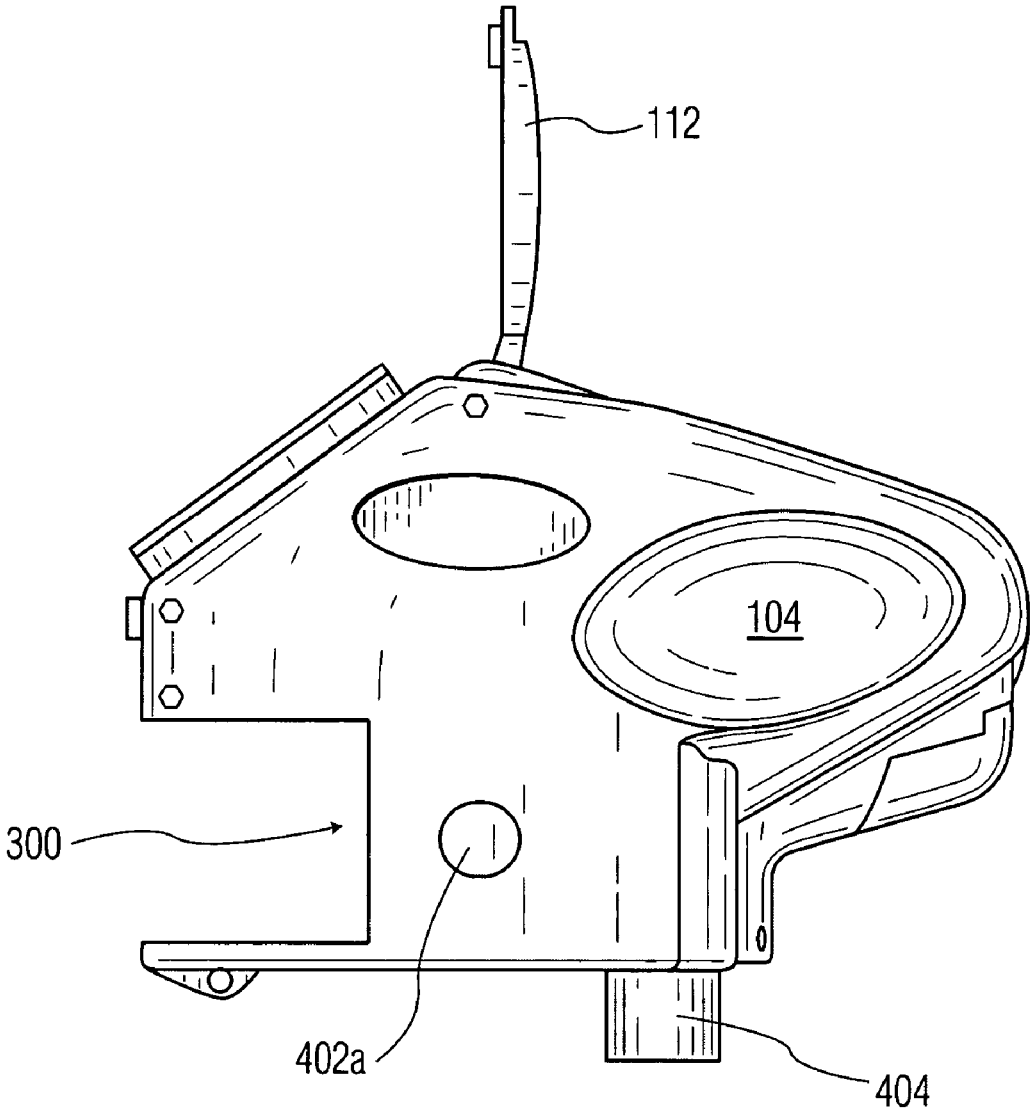
FIG. 4 is a side view of an exemplary loader with the drive/feed mechanism removed in accordance with an aspect of the present invention.
Figure 5:
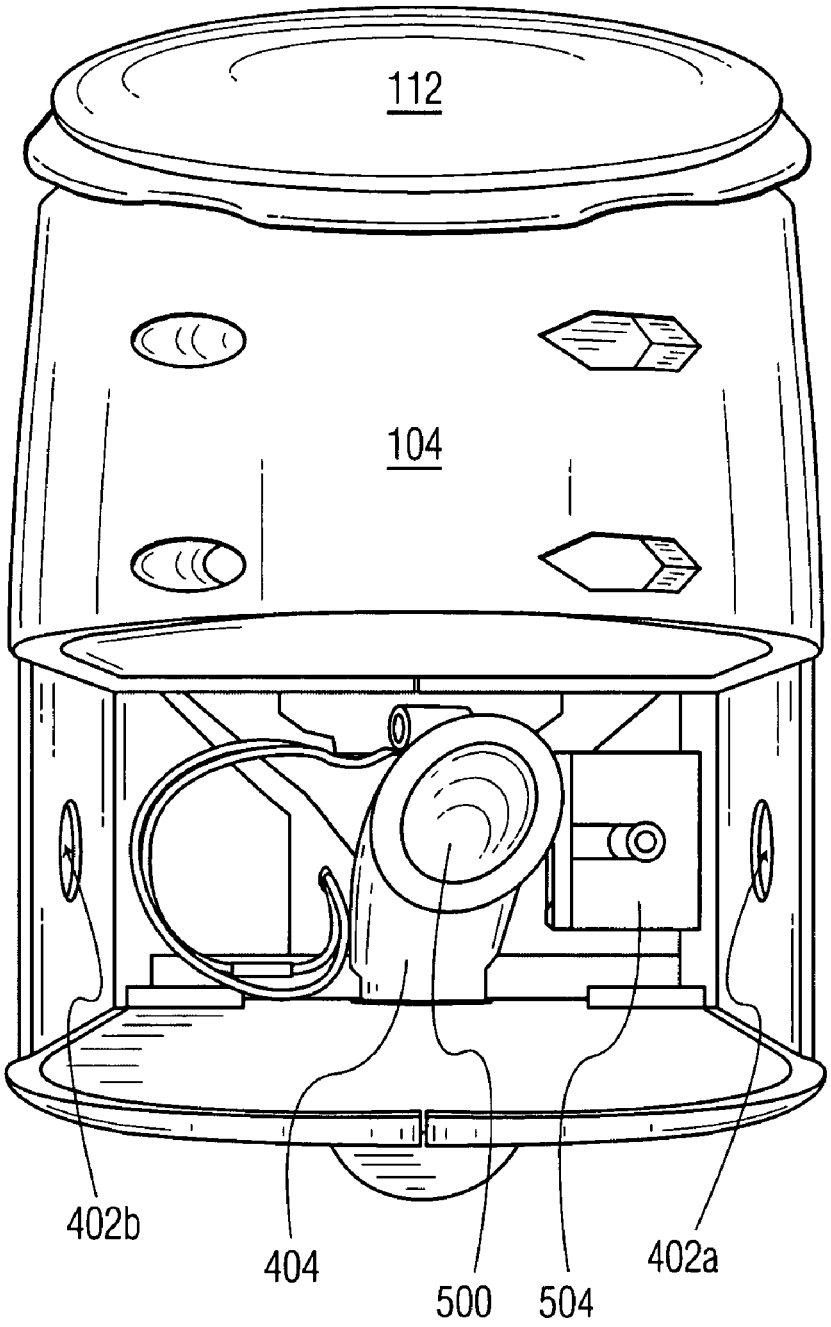
FIG. 5 is a rear view of an exemplary loader with the drive/feed mechanism removed in accordance with an aspect of the present invention.
Figure 6:
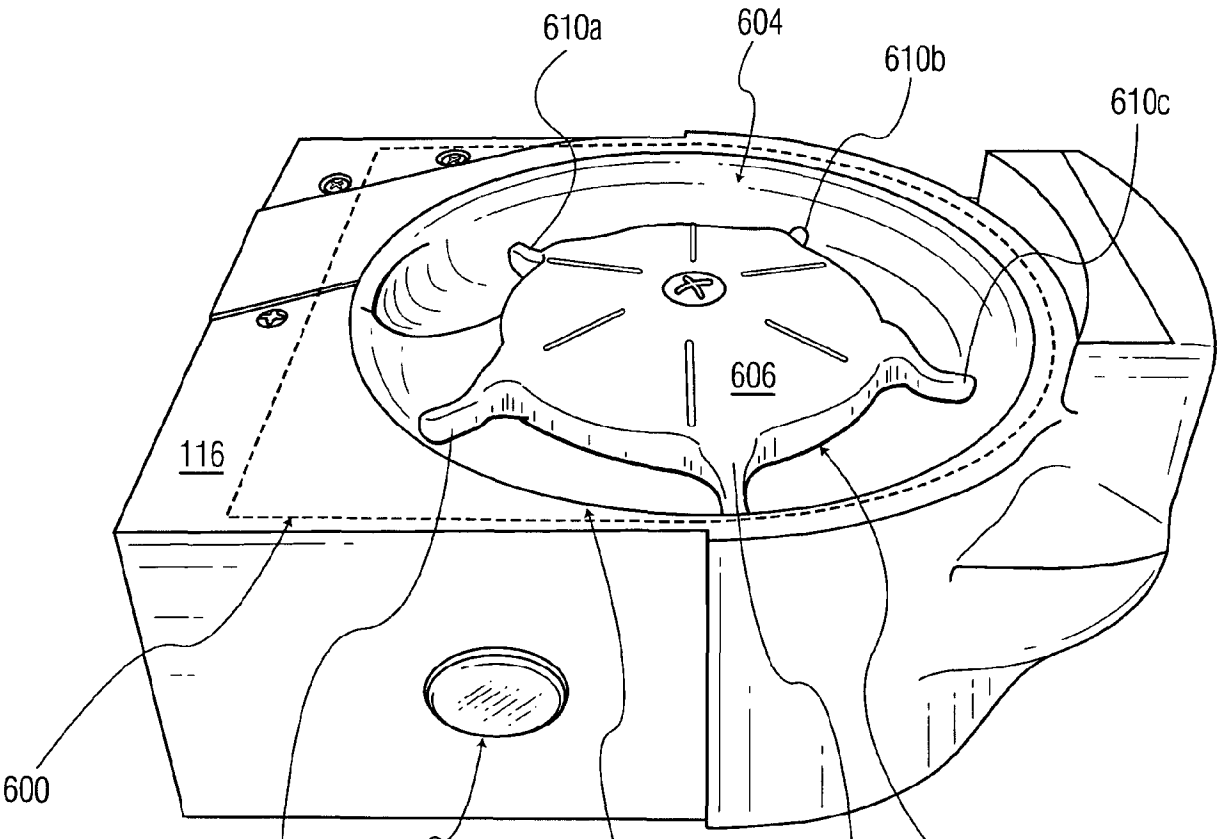
FIG. 6 is a plan view of an exemplary drive/feed mechanism in accordance with an aspect of the present invention.

FIG. 4 depicts a side view of loader 104 with lid 112 in the open position and drive/feed mechanism 116 (FIG. 1) removed. Drive/feed mechanism 116 (FIG. 1) may be inserted into cavity 300 of loader 104. Loader 104 includes an opening 402a for mating with a projection on the drive/feed mechanism 116 to secure drive/feed mechanism 116 to loader 104. Drive/feed mechanism 116 may be released by depressing the projection such that it is disengaged from opening 402a. As illustrated in FIG. 5 (discussed below), a similar opening 402b is present on the other side of loader 104. FIG. 6 (discussed in further detail below) depicts a projection 601 on drive/feed mechanism 116 for mating with opening 402b to secure drive/feed mechanism 116 to loader 104. A similar projection for mating with opening 402a is present on an opposite surface of drive/feed mechanism 116. Other suitable means for securing drive/feed mechanism 116 to loader 104 will be understood by one of skill in the art from the description herein. FIG. 4 further depicts a feed neck 404 of loader 104 that mates with the feed tube 106 (FIG. 1) for supplying paintballs thereto.

FIG. 5 depicts a rear view of loader 104 with drive/feed mechanism 116 removed. A feed neck channel 500 defined within feed neck 404 leads from drive/feed mechanism 116 (when installed) to feed tube 106 of paintball gun 102 when loader 104 is attached to paintball gun 102. A power connector 504 is connected to power source 118 (FIG. 1). Power connector 504 mates with a corresponding power connector of drive/feed mechanism 116 (described below) when drive/feed mechanism 116 is installed within loader 104 to provide power from power source 118 to drive/feed mechanism 116.

FIG. 6 depicts a top perspective view of drive/feed mechanism 116. Drive/feed mechanism 116 includes a feed mechanism 600 and a drive mechanism (described below). Illustrated feed mechanism 600 includes a rotational feeder 602 that moves paintballs along a ball guide 604 into feed neck 404 when rotating to deliver paintballs to the feed tube 106 of paintball gun 102. Together, ball guide 604 and feed neck 404 form a feed channel through which paintballs are delivered from the loader 104 to the feed tube 106. In an exemplary embodiment, ball guide 604 slopes downward to form a spiral downward flow channel at an angle between about 5 degrees and about 15 degrees, for example.

Figure 7:
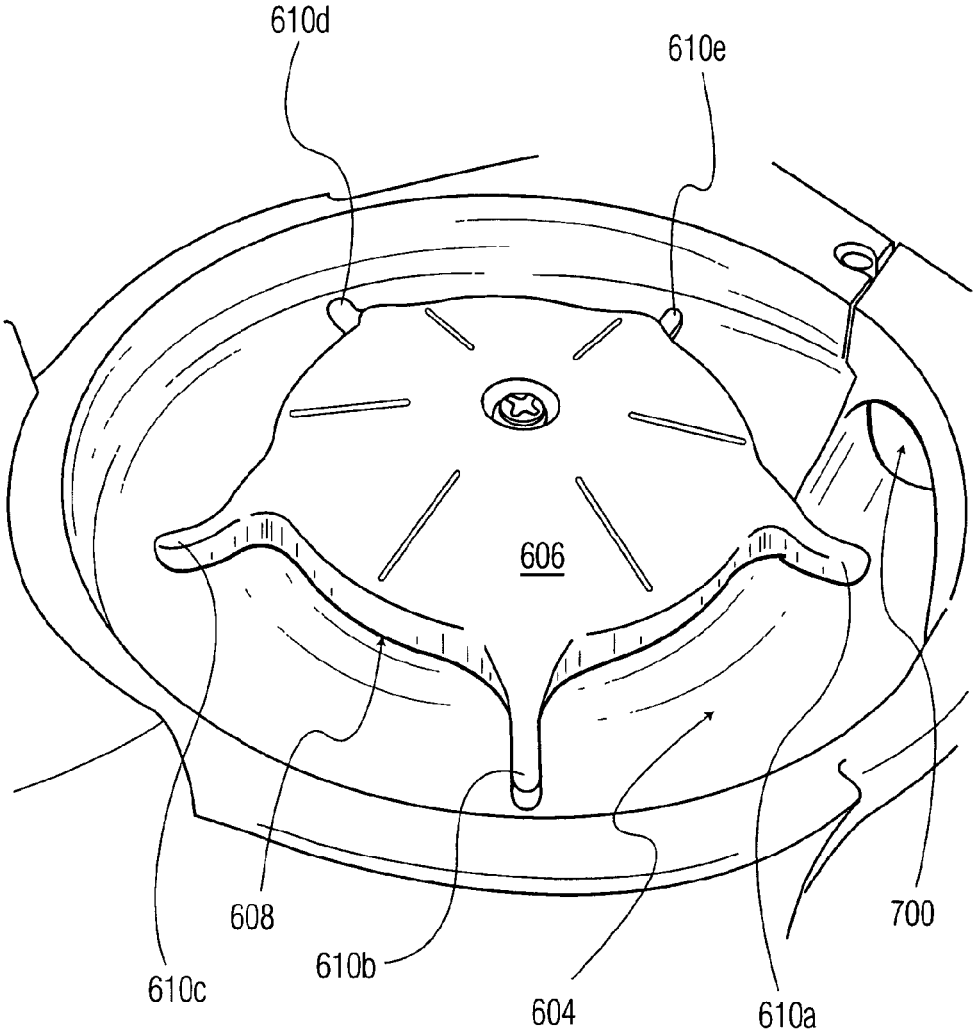
FIG. 7 is a blown-up view of an exemplary rotational feeder of the drive/feed mechanism of FIG. 6 in accordance with an aspect of the present invention.

In an exemplary embodiment, rotational feeder 602 includes a feed wheel 606 having a perimeter 608 and a plurality of fins (represented by five fins 610a-e in the illustrated embodiment) extending from wheel perimeter 608. The feed wheel 606 may be conical (as illustrated), flat, or another shape. The fins 610 may be spaced around perimeter 608 such that at least one paintball can be received between adjacent fins (e.g., between fins 610a and 610b). In an exemplary embodiment, fins 610 are located below a bottom slope of feed wheel 606 such that paintballs within loader 104 will fall between fins 610 and be pushed into the feed neck 404 instead of bouncing around above fins 610 and/or feed wheel 606, which reduces the chance of paintball breakage. FIG. 7 depicts a close-up top perspective view of rotational feeder 602 and an opening 700 leading to feed neck channel 500.

A spiral downward flow channel of ball guide 604 allows paintballs to follow the natural downward gravitational flow. This combined with the positioning of fins 610 on feed wheel 606 results in paintballs moving deeper into the ball guide 604—allowing fins 610 to ride higher on the paintballs as they move closer to the feed neck 404. This reduces the likelihood of a paintball coming out of the ball guide 604 or being disturbed during its movement toward feed neck 404. When a paintball is in the last position before entering feed neck 404, the position of this paintball will not allow another paintball to enter the ball guide 604.

In an alternative exemplary embodiment, rotational feeder 602 may be replaced with an agitator (not shown), e.g., a device used to stir paintballs and prevent paintball jams in the loader.

Figure 8:
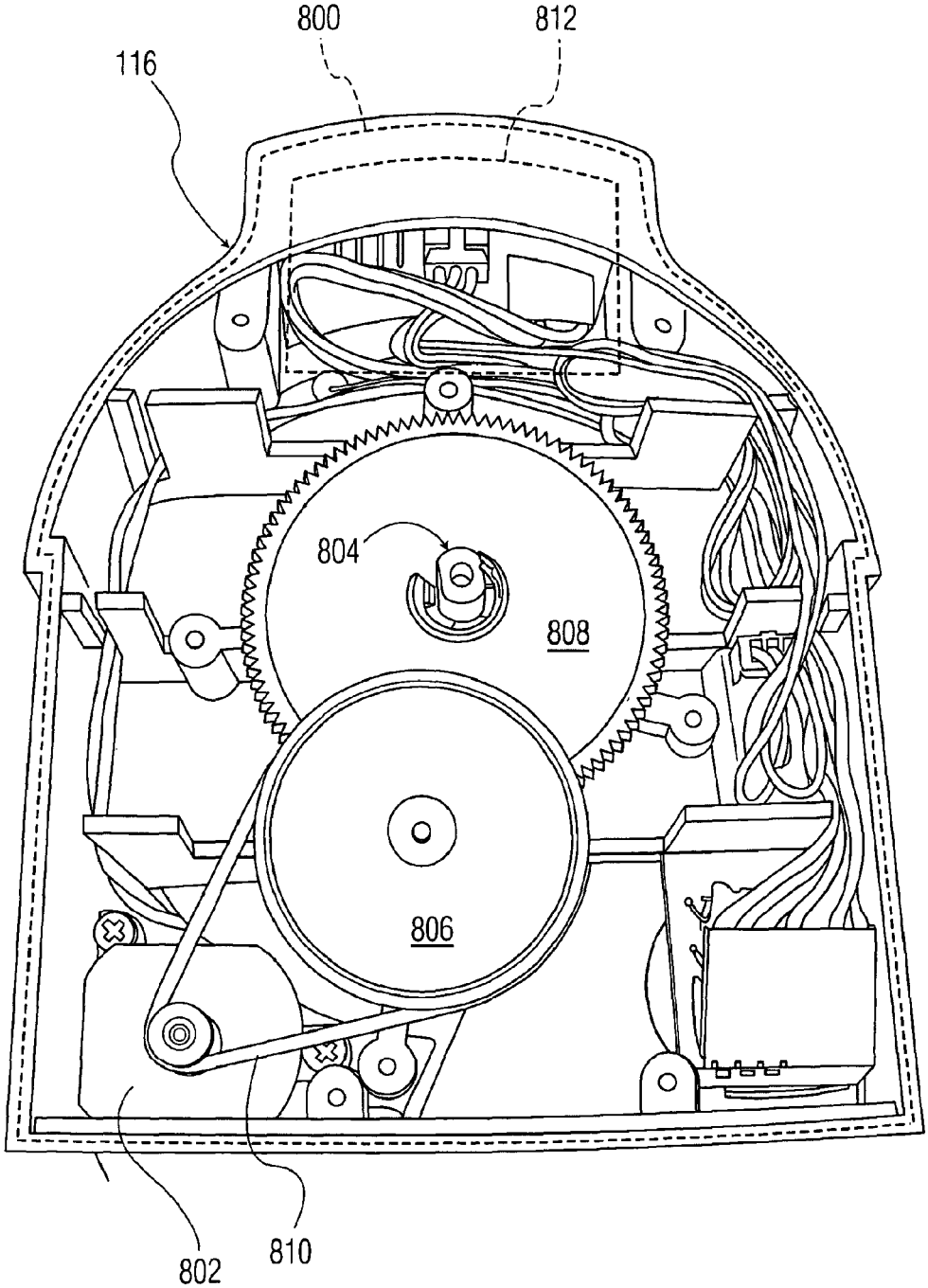
FIG. 8 is a bottom view of the exemplary drive/feed mechanism of FIG. 7 with a cover removed in accordance with an aspect of the present invention.

FIG. 8 depicts a bottom perspective view of drive/feed mechanism 116. Drive/feed mechanism 116 further includes a drive mechanism 800 that drives feed mechanism 600 (FIG. 6). Illustrated drive mechanism 800 includes a drive motor 802 that drives a drive shaft 804 coupled to rotational feeder 602, thereby driving rotational feeder 602. In an exemplary embodiment, drive motor 802 drives rotational feeder 602 at a substantially constant spin rate, which enables smoother ball flow into the space between fins 610 of feed wheel 606 and into feed neck 404, that is faster than the firing rate of paintball gun 102, which reduces lag attributable to the loader 104. Illustrated drive motor 802 drives a primary drive gear 806 that, in turn, drives a secondary drive gear 808. Drive motor 802 drives primary drive gear 806 using a drive belt 810. In an exemplary embodiment, drive belt 810 has teeth and/or is notched (not shown) to prevent slippage, fits between drive motor 802 and primary drive gear 808, and turns without having a tight fit. The drive motor 802, drive gears 806/808, and drive belt 810 may be at least partially covered by a cover (not shown).

Drive motor 802 is controlled by electronics 812. Electronics 812 may include one or more controller(s) for controlling drive motor 802. The controller(s) may include a printed circuit board including discrete components (such as resistors, capacitors, solenoids, switches, etc.) and/or one or more microprocessor(s). In an exemplary embodiment, a microprocessor is programmed to control drive motor 802. Additionally, switches (not shown) may be connected to the microprocessor to provide user input. For example, a first switch may be provided to reverse the direction of the drive motor 802 and a second switch may be provided to turn the drive mechanism 800 on/off, turn an optional RF module on/off, change the attempt frequency (described below) and/or change the speed of rotation of the drive shaft 804 and, thus, the rotational feeder 602. Suitable microprocessors, discrete components, and switches, and programming of the microprocessors to provide the functionality herein described, will be understood by one of skill in the art from the description herein.

Electronics 812 may receive/transmit data from/to electronics (not shown) within paintball gun 102, e.g., via transceivers 120/122 (FIG. 1). For example, data from paintball gun 102 may be displayed on a display (not shown) of loader 104 such as a liquid crystal display (LCD) panel. Additionally, electronics 812 may allow communication with the paintball gun 102 so that they function as one unit to improve the overall performance of both. For example, paintball gun 102 could have performance programs that would help to speed up the rate of fire by allowing loader 104 to know in advance that paintball gun 102 will run a particular program, thereby permitting electronics 812 to optimize loader 104 for use with that program.

In addition, the display may be uses for displaying parameters relating to operation of the paintball gun 102 and/or loader 104. For example, shot count, elapsed game time, paintball usage, battery life, remaining paintballs in loader 104, etc. may be monitored by known controllers within the paintball gun 102 and/or electronics 812 of loader 104, as appropriate. Parameters monitored by paintball gun 102 may be transferred to electronics 812 of loader 104 for display via transceivers 120/122, and electronics 812 may display parameters monitored by and received directly from loader 104. Selection of parameters displayed may be accomplished using selection elements (such as switches) coupled to electronics 812 of loader 104 and/or coupled to paintball gun 102 and transmitted to electronics 812 via transceivers 120/122.

Figure 9:
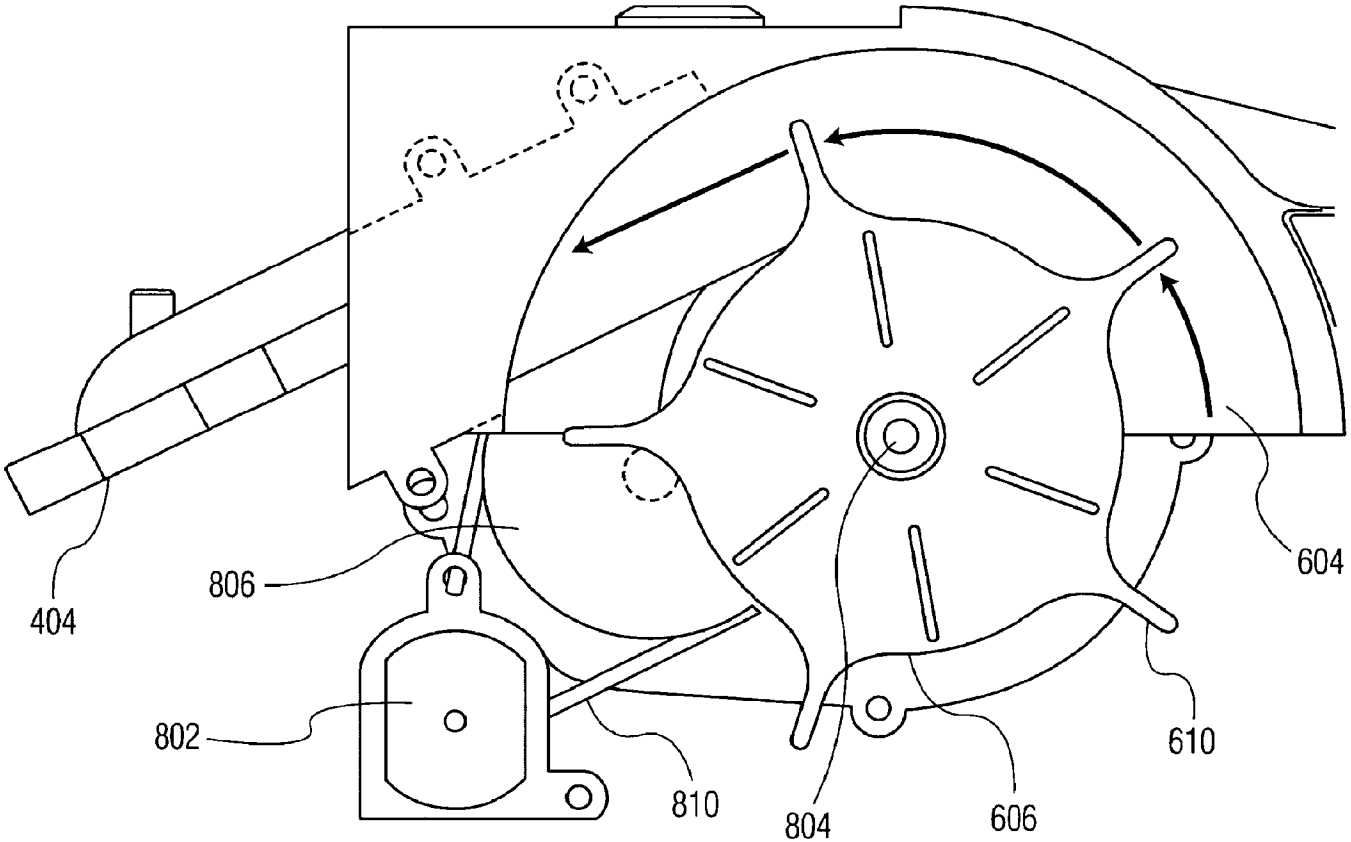
FIG. 9 is a schematic view of the exemplary drive/feed mechanism of FIG. 7 in accordance with an aspect of the present invention.
Figure 10:
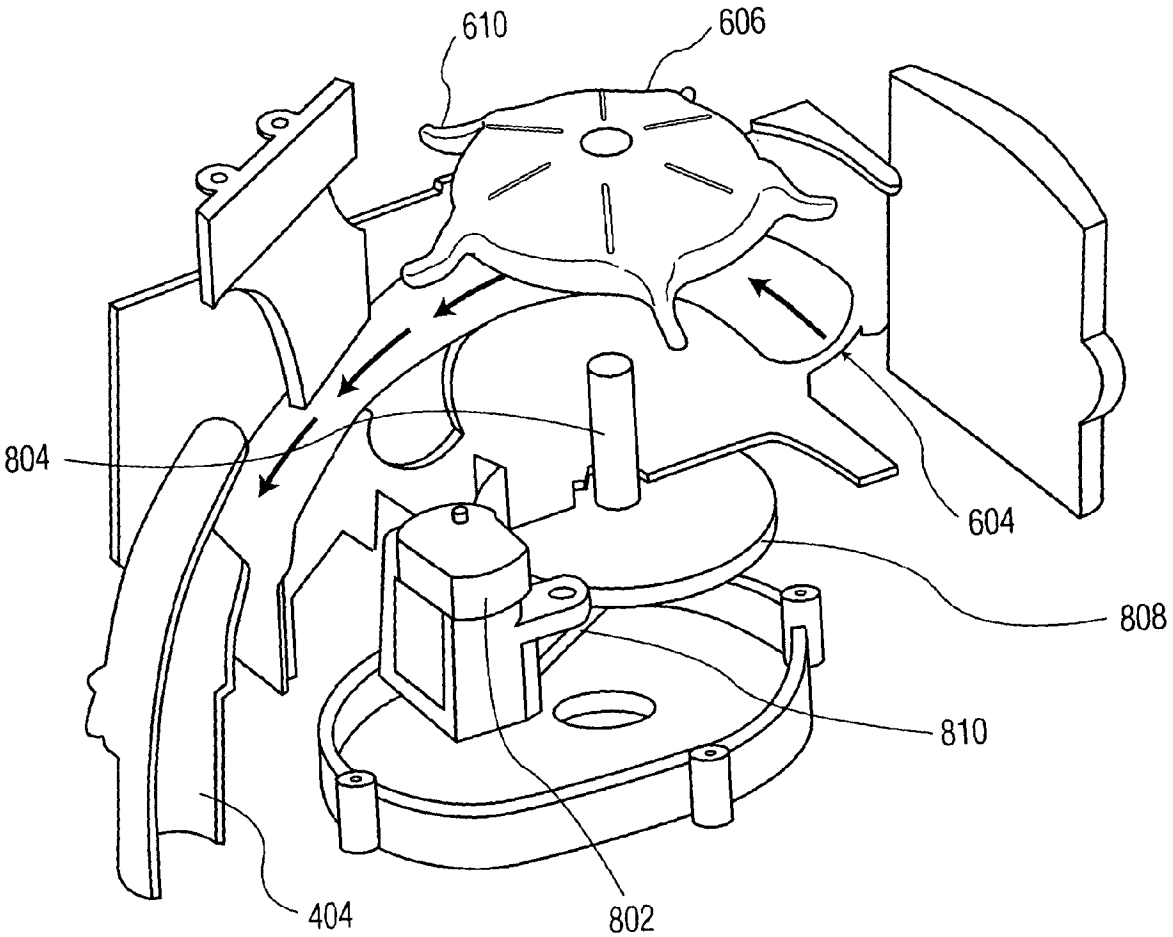
FIG. 10 is an exploded view of the exemplary drive/feed mechanism of FIG. 7 in accordance with an aspect of the present invention.
Figure 11:
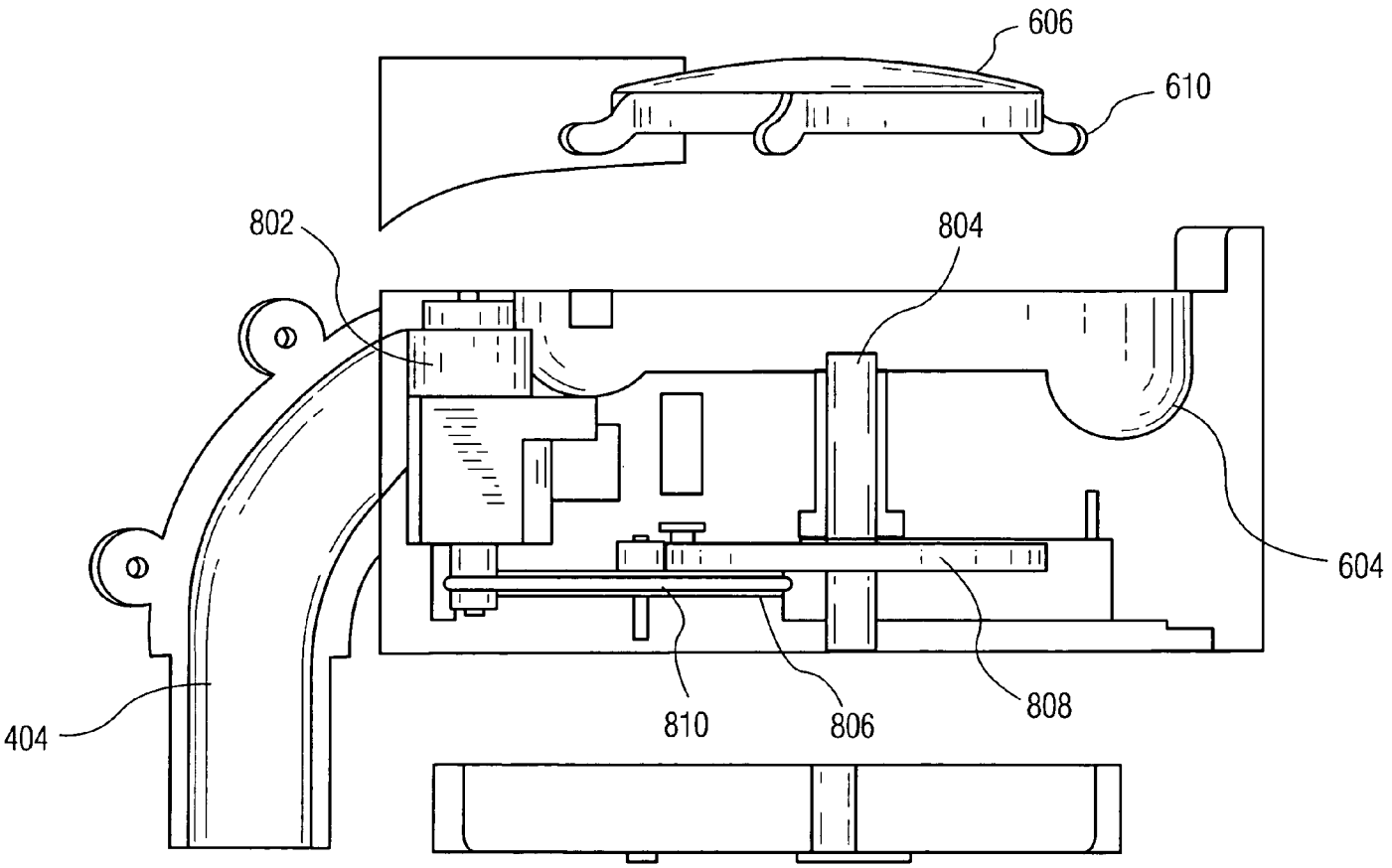
FIG. 11 is an elevation view of the exemplary drive/feed mechanism of FIG. 7 in accordance with an aspect of the present invention.

FIG. 9 is a schematic view of an exemplary drive/feed mechanism 116 and FIGS. 10 and 11 are side and elevation views, respectively. In an exemplary operation, drive motor 802 (under control of electronics 812) moves drive belt 810. Drive belt 810 turns primary drive gear 806 which, in turn, turns secondary drive gear 808 (FIG. 8) coupled to drive shaft 804. Drive shaft 804 is coupled to feed wheel 606. Thus, drive motor 802 drives/rotates feed wheel 606. In an exemplary embodiment, paintballs in chamber 114 (FIG. 1) roll down a slope of feed wheel 606 and become seated in ball guide 604 between adjacent feed wheel fins 610. As feed wheel 606 rotates counterclockwise, feed wheel fins 610 urge the paintballs between adjacent fins along the ball guide 604 into feed neck 404. Although the illustrated embodiments utilize counterclockwise rotation of the feed wheel 606 to load paintballs, other embodiments may be configured for clockwise rotation of the feed wheel 606. In an exemplary embodiment, the feed wheel 606 may be rotated in a direction opposite to its normal operation.

Figure 12:
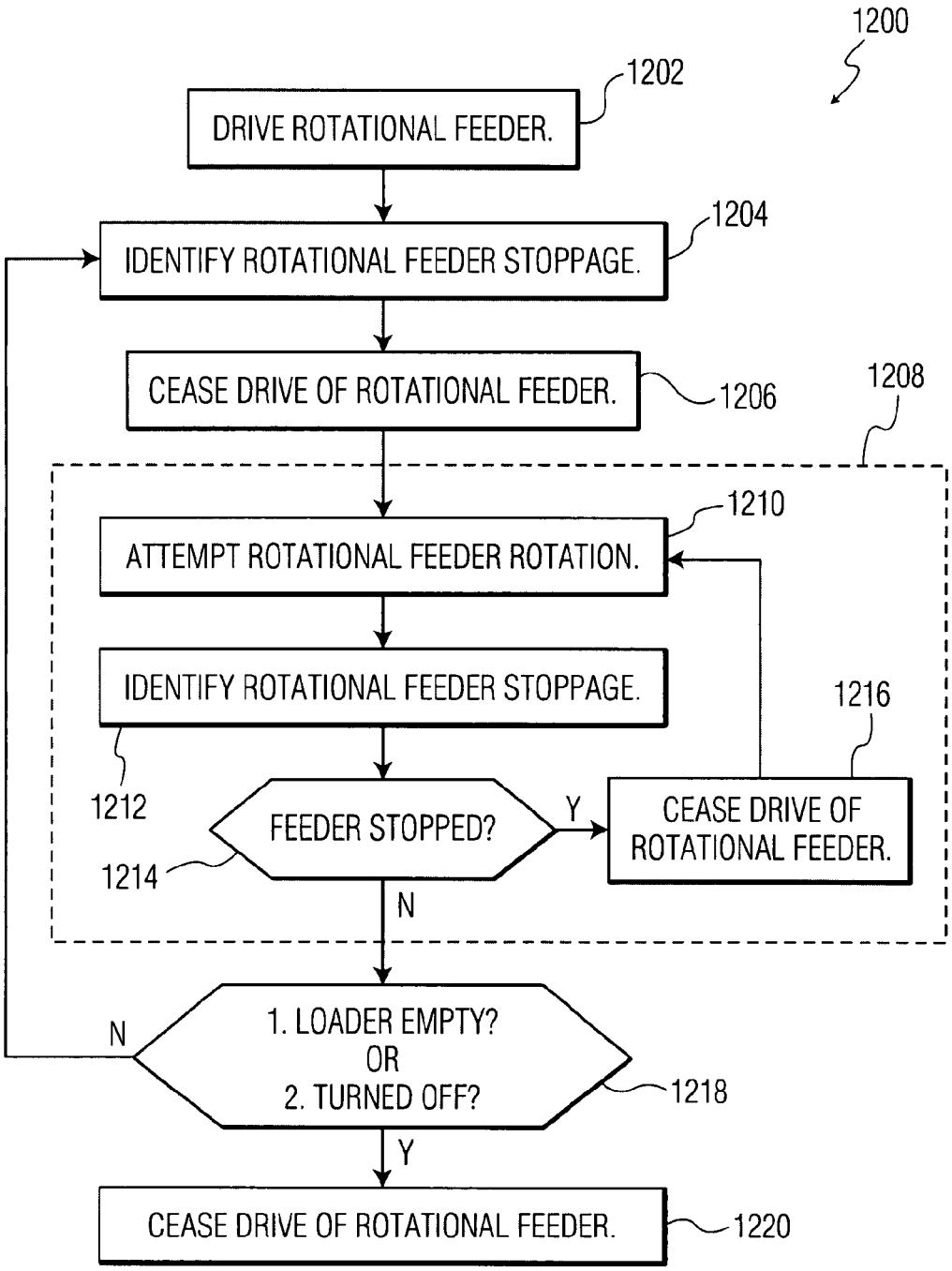
FIG. 12 is a flow chart of exemplary steps for loading paintballs into a feed tube of a paintball gun in accordance with an aspect of the present invention.

FIG. 12 depicts a flow chart 1200 of exemplary steps for loading paintballs from a loader into a feed tube of a paintball gun. The exemplary steps are described with reference to FIGS. 1-11. Although described with reference to FIGS. 1-11, it will be understood that the exemplary steps may be employed with other loaders and paintball guns without departing from the scope of the present invention. Suitable loaders and paintball guns with which the exemplary steps may be employed will be understood by one of skill in the art from the description herein.

A step 1202, a rotational feeder within a loader is driven. In an exemplary embodiment, drive motor 802 (under control of electronics 812) drives rotational feeder 602 (e.g., feed wheel 606 and fins 610) such that paintballs within ball guide 604 are moved along ball guide 604 into feed neck 404 and, thus, feed tube 106 of paintball gun 102.

At step 1204, stoppage of the rotational feeder is identified. In an exemplary embodiment, electronics 812 within drive mechanism 800 identify stoppage of the rotational feeder 602. Electronics 812 may identify stoppage of rotational feeder 602 by detecting current and/or resistance increases in drive mechanism 800 due to stoppage of rotational feeder 602 which, in turn, stops drive motor 802. Rotational feeder 602 may be stopped by one or more broken paintballs and/or a full feed tube 106 and feed neck 404, for example. In an exemplary embodiment, a notched drive belt 810 is utilized. The notched drive belt reduces current draw or load on drive motor 802, thereby increasing efficiency. Additionally, it reduces slippage which makes it easier to obtain accurate current and/or resistance measurements.

At step 1206, driving of the rotational feeder is ceased responsive to stoppage of the rotational feeder. In an exemplary embodiment, drive motor 802 (under control of electronics 812) ceases to drive rotational feeder 602 responsive to the identification of the stoppage of rotational feeder 602 in step 1204.

At step 1208, periodic attempts are made to rotate the stopped rotational feeder. Exemplary steps for periodically attempting to rotate the stopped rotational feeder are set forth in step 1210 through step 1216. In an exemplary embodiment, a pro-active periodic attempt to rotate the stopped rotational feeder is performed at an attempt frequency. The attempt frequency may be a loader operation parameter actuated/selected, e.g., manually by an operator via electronics 812, from one or more predefined attempt frequencies. For example, from between a first frequency (e.g., a frequency between about 0.25 and about 0.75 seconds) and a second frequency (e.g., a frequency between about 1.0 and about 5.0 seconds).

In an exemplary embodiment, electronics 812 may shorten the attempt is frequency (e.g., to a frequency between about 0.001 seconds or faster and about 0.1 seconds) in response to a firing signal (e.g., generated by paintball gun 102 and received via transceivers 120/122). Upon identification of the stoppage of rotational feed 602 (described above) and/or after a predetermined period of time (e.g., 5-10 seconds), the attempt frequency may revert to the initial attempt frequency. In accordance with this embodiment, a firing event/operation, such as actuation of a trigger, may be detected by a sensor, which results in controller/transceiver 120 of paintball gun 102 being notified of the firing event/operation. Transceiver 120 then transmits a loader operation signal to transceiver 122 of loader 104, which notifies controller/electronics 812. Controller/electronics 812 then operate according to the shortened attempt frequency until stoppage of the rotational feeder is identified, at which time controller/electronics 812 change the attempt frequency back to the initial attempt frequency.

In an alternative exemplary embodiment, an attempt to rotate the rotational feeder may be initiated in response to the firing signal. In accordance with this embodiment, a firing event/operation, such as actuation of a trigger, may be detected by a sensor, which results in controller/transceiver 120 of paintball gun 102 being notified of the firing event/operation. Transceiver 120 then transmits a loader operation signal to transceiver 122 of loader 104, which notifies controller/electronics 812 to operate the drive motor 802.

Accordingly, drive mechanism 800 may use multiple means of pro-active engagement of the rotational feeder 602. In an exemplary embodiment, a pulse or signal is preferably sent to actuate loader 104 prior to the cycling of paintball gun 102. By the time paintball gun 102 has cycled its first shot, loader 104 preferably is at its maximum speed or feed rate, allowing paintball gun 102 to fire at its maximum or desired rate of fire or BPS. Pro-active actuation according to the present invention reduces delays that are caused by delayed ON signals for conventional "reactive" loaders.

At step 1210, an attempt is made to rotate the stopped rotational feeder. In an exemplary embodiment, drive motor 802 (under control of electronics 812) attempts to rotate rotational feeder 602. Electronics 812 may include a timer (not shown) that increments a counter to control the frequency at which attempts are is made to rotate rotational feeder 602. Upon the counter reaching a value associated with an attempt frequency, electronics 812 attempt to rotate rotational feeder 602 and resets the counter. Identification of a firing signal at electronics 812 may cause the electronics to reduce the value associated with the attempt frequency to a lower value associated with a shorter attempt frequency. Alternatively, electronics 812 may advance the counter (e.g., at a faster rate or to a predetermined value) to effectively shorten the attempt frequency in response to identification of the firing signal. In an alternative exemplary embodiment, electronics 812 may attempt to rotate rotational feeder 602 in response to the firing signal.

At step 1212, stoppage of the rotational feeder is identified in response to the attempted rotation at step 1210. In an exemplary embodiment, stoppage of the rotational feeder is performed as described above regarding step 1204. In exemplary embodiments, identification of stoppage of rotational feeder 602 and/or passage of a predetermined period of time results in electronics 812 reestablishing the initial attempt frequency and/or counter rate described above with reference to step 1210.

At step 1214, a determination is made regarding stoppage of the rotational feeder. If the rotational feeder is stopped, processing proceeds at step 1216. Otherwise, processing proceeds at step 1218. In an exemplary embodiment, electronics 812 make the determination regarding stoppage of rotational feeder 602.

At step 1216, driving of the rotational feeder is ceased responsive to identification of the stoppage of the rotational feeder. In an exemplary embodiment, driving of rotational feeder 602 is ceased as described above regarding step 1206 and, thus, will not be described in further detail. Processing then proceeds at block 1210 with the attempted rotation and cessation of driving steps repeating until a determination is made that the rotational feeder is no longer stopped, e.g., at step 1214.

In an exemplary embodiment, step 1210 through step 1216 operate together as follows. Electronics 812 periodically attempt to supply power to drive motor 802. The attempts may be timed such that they occur faster than the maximum firing rate (typically measured in cycles per second) of the paintball gun 102 with which loader 104 will be used. The drive motor 802 attempts to turn rotational feeder 602 to force paintballs into feed neck 404 when power is supplied. When feed neck 404 of loader 104 is full and the paintball stack in the loader neck 404 prevents rotational feeder 602 from turning, electronics 812 identify this stoppage through a current reading or resistance reading. At a calculated and appropriate current feedback, electronics 812 remove power from the drive motor 802. If electronics 812 supply power to drive motor 802 and the paintball stack is full, the electronics 812 will remove power and wait a predefined period of time before re-supplying power (e.g., 0.5 or 3.0 seconds). This results in pulsation of the rotational feeder 602. When a paintball is fired, thereby creating a void in the feed neck/feed tube, drive motor 812 continues to turn in response to the power supplied by electronics 812.

At step 1218, a determination is made regarding the drive mechanism 800. In an exemplary embodiment, if either the drive mechanism 800 is turned off or the loader 104 is empty (e.g., the chamber 114 is empty or the loader does not include enough paintballs to fill feed neck 404), processing proceeds at step 1220 with the drive motor 802 no longer driving the rotational feeder 602. Otherwise, drive motor 802 continues to drive the rotational feeder 602 and processing continues at step 1204. In an exemplary embodiment, a determination is made that the loader 104 is empty if the rotational feeder 602 has rotated continuously for a period of time (e.g., for 2 minutes or more). In alternative exemplary embodiment, sensors within the chamber 114 and/or feed neck 404 may be used to determine if the loader 104 is empty.

Additional implementations/embodiments of the present invention are now described. A wireless projectile loader system (e.g., a paintball gun and paintball loader therefore) is provided that includes a compressed gas gun (e.g., a paintball gun that uses compressed gas to launch projectiles such as paintballs) having at least one sensor for detecting a firing operation (e.g., actuation of the trigger of a paintball gun) and sending a sensor signal, a wireless transmitter in communication with the at least one sensor that is adapted to receive the sensor signal and send a wireless signal in response to the sensor detecting a firing operation, and a projectile loader (e.g., paintball loader) having an agitator, a motor for operating the agitator, and at least one wireless receiver in communication with the motor adapted to receive the wireless signal. The wireless projectile loader system may additionally include a controller in communication with the receiver for operating the motor. The controller may include a microprocessor.

Another wireless projectile loader system is provided that includes at least one sensor for detecting a firing operation of a compressed gas gun and sending a sensor signal, a wireless transmitter in communication with the at least one sensor that is adapted to receive the sensor signal and send a wireless signal in response to the sensor detecting a firing operation, and at least one wireless receiver for receiving the wireless signal that is in communication with a motor of a projectile loader and adapted to initiate operation of the motor in response to the wireless signal transmitted by the transmitter. The wireless projectile loader system may further include a controller in communication with one of the transmitter and the receiver. The controller may include a microprocessor.

A method of wirelessly operating a projectile loader is provided that includes detecting a firing operation of a compressed gas gun, wirelessly transmitting a signal in response to the firing operation, receiving the signal, and operating a motor of the projectile loader.

Another method of wirelessly operating a projectile loader is provided that includes providing a compressed gas gun having at least one sensor and at least one wireless transmitter in communication with the at least one sensor, providing a projectile loader having a motor and at least one wireless receiver in communication with the motor, detecting a firing operation of the compressed gas gun with the sensor, transmitting a demand signal (e.g., a signal generated in response to actuation of a paintball gun trigger) from the sensor to the wireless transmitter, wirelessly transmitting a loader operation signal (e.g., a signal for requesting operation of the loader motor) from the wireless transmitter to the wireless receiver, and operating the motor in response to the loader operation signal.

A wireless system for controlling operation of a projectile loader is provided that includes a compressed gas gun having a controller and a wireless transmitter in communication with the controller, and a projectile loader having a receiver for receiver wireless signals from the wireless transmitter and a controller for controlling an operation of the projectile loader. The wireless system may further include at least one user-actuated selection element in communication with the controller.

A method of controlling operation of a projectile loader is provided that includes selecting a projectile loader operation parameter, wirelessly transmitting a signal in response to the selection, receiving the signal, and controlling the operation of the projectile loader in response to the signal.

Another method of controlling operation of a projectile loader is provided that includes wirelessly transmitting a signal representing a projectile loader operation parameter, receiving the signal, and controlling the operation of the projectile loader in response to the signal. The method may further include selecting a projectile loader operation parameter prior to wirelessly transmitting the signal.

Although the present invention has been described for use with a loader of a paintball gun that attaches above the paintball gun, it may be used with other types of paintball loading objects (e.g., backpacks, etc.) and in other fields, as apparent to a person skilled in the art. For this reason, expressions such as "paintball," "gun," "loader," etc., as used herein should not be taken as to limit the scope of the present invention and includes all other kinds of guns and/or items with which the present invention could be used and may be useful. Indeed, although the drive system according to the present invention is preferably used in the paintball industry, it is to be understood by a person skilled in the art that it could be used for any other kind of dispensing device (e.g., gun, etc.) requiring the feeding of objects (balls, paintballs, etc.) from a drive system as described herein.

It is contemplated that the invention may be implemented in software running on a processor. In this embodiment, one or more of the above described steps may be implemented in software that controls the computer. This software may be embodied in a computer readable medium, for example, a memory, a magnetic or optical disk, a memory-card or an audio frequency, radio-frequency, or optical carrier wave.

While preferred embodiments of the invention have been shown and described herein, it will be understood that such embodiments are provided by way of example only. Numerous variations, changes and substitutions will occur to those skilled in the art without departing from the scope of the present invention. Accordingly, it is intended that the appended claims cover all such variations as fall within the scope and range of equivalents of the invention.

What is claimed:

1. A loader for use with a paintball gun having a transmitter that transmits a signal, the loader comprising:

a receiver for receiving the signal from the paintball gun;

a chamber having an opening for receiving paintballs;

a lid coupled to the chamber, the lid having a closed position in which the opening is covered by the lid and an open position in which the opening is at least partially uncovered;

*a feed neck attachable to a feed tube of a paintball gun; and* a loader lid release coupled to the receiver that maintains the lid in the closed position until released in response to reception of the signal by the receiver.

2. The loader of claim 1, wherein the loader lid release comprises:

a first magnet positioned on the lid; and a second magnet positioned on the chamber, the second magnet repelling the first magnet in response to reception of the signal by the receiver.

*3. The loader of claim 1, wherein the loader is configured for use with a paintball gun that includes a trigger interconnected with the transmitter of the paintball gun for transmitting the signal in response to activation of the trigger.*

*4. The loader of claim 1, wherein the signal is a radio frequency (RF) signal and the receiver is an RF receiver.*

*5. The loader of claim 1, wherein the loader is configured for use with a paintball gun that includes a switch interconnected with the transmitter of the paintball gun for transmitting the signal responsive to the switch.*

*6. A loader for use with a paintball gun, the loader comprising:*

*a receiver for receiving a signal;*

*a chamber having an opening for receiving paintballs;*

*a feed neck attachable to a feed tube of a paintball gun;*

*a lid coupled to the chamber, the lid having a closed position in which the opening is covered by the lid and an open position in which the opening is at least partially uncovered; and*

*a loader lid release coupled to the receiver and configured to maintain the lid in the closed position until released in response to reception of the signal by the receiver.*

*7. The loader of claim 6, wherein the loader lid release comprises:*

*a first magnet positioned on the lid; and*

*a second magnet positioned on the chamber, the second magnet repelling the first magnet in response to reception of the signal by the receiver.*

*8. The loader of claim 6, wherein the loader is configured for use with a paintball gun that includes a transmitter for transmitting the signal to the loader.*

*9. The loader of claim 6, wherein the signal is a radio frequency (RF) signal and the receiver is an RF receiver.*

*10. The loader of claim 6, wherein the loader is configured for use with a paintball gun that includes a switch or trigger interconnected a transmitter for transmitting the signal responsive to activation of the switch or trigger.*

*11. A loader for a paintball gun, said loader comprising:*

*a chamber configured to house a quantity of paintballs to be supplied into the paintball gun;*

*a lid arranged over an opening to the chamber, said lid configured to prevent the quantity of paintballs from escaping from the chamber through the opening when the lid is in a closed position;*

*a magnetic closure mechanism configured to selectively retain the lid in the closed position over the opening; and*

*a magnetic release mechanism configured to selectively reverse a polarity of a magnet in the magnetic closure mechanism holding the lid in the closed position to cause the lid to open.*

*12. The loader of claim 11, wherein the magnetic release mechanism comprises:*

*a first magnet positioned on one of the lid or the chamber; and*

*a second magnet positioned on the other of the lid or the chamber, the second magnet repelling the first magnet in response to an opening signal.*

*13. The loader of claim 12, wherein the loader is configured for use with a paintball gun that includes a transmitter for transmitting the opening signal.*

*14. The loader of claim 12, wherein the loader further comprises a receiver configured to receive the opening signal from a transmitter, wherein the opening signal is a radio frequency (RF) signal and the receiver is an RF receiver.*

*15. The loader of claim 11, wherein the loader further comprises a receiver configured to receive a signal, and wherein the loader is configured for use with a paintball gun that includes a switch interconnected a transmitter for transmitting the signal responsive to activation of the switch to open the lid.*

* * * * *